United States Patent
Hong

(10) Patent No.: US 11,009,701 B2
(45) Date of Patent: May 18, 2021

(54) DISPLAY APPARATUS AND METHOD FOR DRIVING THE SAME

(71) Applicant: BOE Technology Group Co., Ltd., Beijing (CN)

(72) Inventor: Tao Hong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 136 days.

(21) Appl. No.: 16/176,388

(22) Filed: Oct. 31, 2018

(65) Prior Publication Data
US 2019/0219819 A1  Jul. 18, 2019

(30) Foreign Application Priority Data

Jan. 18, 2018  (CN) .......................... 201810049329.5

(51) Int. Cl.
| | | |
|---|---|---|
| *G02B 27/01* | (2006.01) | |
| *G09G 3/00* | (2006.01) | |
| *G02B 27/28* | (2006.01) | |
| *G02B 27/30* | (2006.01) | |
| *B60K 35/00* | (2006.01) | |

(52) U.S. Cl.
CPC .......... *G02B 27/0101* (2013.01); *B60K 35/00* (2013.01); *G02B 27/283* (2013.01); *G02B 27/286* (2013.01); *G02B 27/30* (2013.01); *G09G 3/001* (2013.01); *G02B 2027/011* (2013.01); *G02B 2027/014* (2013.01); *G09G 2310/08* (2013.01); *G09G 2380/10* (2013.01)

(58) Field of Classification Search
CPC .. G02B 27/0101; G02B 27/30; G02B 27/283; G02B 27/286; G02B 2027/011; G02B 2027/014; G02B 2027/0196; G09G 3/001; G09G 2380/10; G09G 2310/08; G09G 3/20; B60K 35/00; B60K 2370/349; B60K 2370/334; B60K 2370/52

See application file for complete search history.

(56) References Cited

U.S. PATENT DOCUMENTS

| | | | | |
|---|---|---|---|---|
| 2011/0193880 A1* | 8/2011 | Imai | ....................... | G09G 3/003 345/634 |
| 2013/0044274 A1* | 2/2013 | Wu | ........................ | H04N 13/00 349/62 |
| 2017/0336628 A1* | 11/2017 | Kim | ......................... | G02B 5/30 |

* cited by examiner

*Primary Examiner* — Jonathan A Boyd

(74) *Attorney, Agent, or Firm* — Nath, Goldberg & Meyer; Joshua B. Goldberg

(57) ABSTRACT

A display apparatus and a method for driving the same are provided. The display apparatus includes: a timing control circuit; a display source, configured to generate a light having first display information and a light having second display information, under control of the timing control circuit, during mutually alternate first and second timings, respectively; a polarizer, configured to, under control of the timing control circuit, convert the light having the first display information into a first linearly polarized light during the first timing, and convert the light having the second display information into a second linearly polarized light during the second timing; and an optical path controller, configured to receive the first linearly polarized light and the second linearly polarized light from the polarizer, and to project the first linearly polarized light and the second linearly polarized light, spatially separate from each other, into a user's eyes.

16 Claims, 5 Drawing Sheets

DISPLAY APPARATUS AND METHOD FOR DRIVING THE SAME

CROSS-REFERENCE TO RELATED APPLICATIONS

The present application claims the priority of Chinese Patent Application No. 201810049329.5, filed on Jan. 18, 2018 in the Chinese Patent Office, the contents of which are incorporated herein by reference in its entirety.

TECHNICAL FIELD

The present disclosure relates to a field of display technology, in particularly, to a head-up display apparatus and a method for driving the head-up display apparatus.

BACKGROUND

The head-up display (HUD) apparatus, which may also be referred to as heads-up display is widely used in the field of vehicle. Typically, the head-up display apparatus projects vehicle information such as vehicle speed and navigation information from an instrument panel of a vehicle onto a windshield of the vehicle. Therefore, the driver of the vehicle may see this vehicle information and navigation information without looking down at the instrument panel, thereby avoiding the potential risk of traffic accidents.

SUMMARY

According to an aspect of the disclosure, a display apparatus is provided, the display apparatus includes: a timing control circuit; a display source, configured to generate a light having first display information and a light having second display information, under control of the timing control circuit, during mutually alternate first and second timings, respectively, the first display information being different from the second display information; a polarizer, configured to, under control of the timing control circuit, convert the light having the first display information into a first linearly polarized light during the first timing, and convert the light having the second display information into a second linearly polarized light during the second timing, the first linearly polarized light and the second linearly polarized light having different polarization directions; and an optical path controller, configured to receive the first linearly polarized light and the second linearly polarized light from the polarizer, and project the first linearly polarized light and the second linearly polarized light spatially separate from one another.

In an embodiment, the first linearly polarized light has a polarization direction that is perpendicular to a polarization direction of the second linearly polarized light.

In an embodiment, the first linearly polarized light and the second linearly polarized light are projected spatially separate from one another in a horizontal direction.

In an embodiment, the first linearly polarized light and the second linearly polarized light are projected on a left part and a right part of the transflective element, respectively, and the transflective element is configured to reflect the first linearly polarized light and the second linearly polarized light.

In an embodiment, the optical path controller includes a polarization beam splitter prism.

In an embodiment, the polarization beam splitter prism includes a single Wollaston prism.

In an embodiment, the polarization beam splitter prism includes a plurality of Wollaston prisms stacked on each other, and two adjacent Wollaston prisms are arranged to be mirror-symmetrical with regard to an interface therebetween.

In an embodiment, the first linearly polarized light includes one of an S-polarized light and a P-polarized light; and the second linearly polarized light includes the other one of the S-polarized light and the P-polarized light.

In an embodiment, an aberration compensation circuit, is configured to generate a first aberration compensation signal and a second aberration compensation signal for compensating for aberrations generated by the first linearly polarized light and the second linearly polarized light during a propagation process thereof, during the first timing and the second timing, respectively, and provide the first aberration compensation signal and the second aberration compensation signal to an image rendering circuit, and the image rendering circuit, configured to generate the first display information and the second display information during the first timing and the second timing, respectively, and encode the first display information and the second display information and provide the first display information and the second display information to the display source.

In an embodiment, the display apparatus may include one or more reflectors configured to reflect the first linearly polarized light and the second linearly polarized light from the polarizer to the optical path controller.

In an embodiment, immediately adjacent one first timing and one second timing constitute a display period, and the display period is smaller than a refresh period of human eyes.

In an embodiment, the first display information includes one or more of a vehicle speed, an oil temperature, and a water temperature, and the second display information includes one or more of indication information of an external object and navigation information.

In an embodiment, the display apparatus may include a collimator located between the display source and the polarizer, and the collimator is configured to collimate the light from the display source and transmit the collimated light to the polarizer.

The display apparatus may further include: an aberration compensation circuit, configured to generate a first aberration compensation signal and a second aberration compensation signal for compensating for aberrations generated by the first linearly polarized light and the second linearly polarized light during a propagation process thereof, during the first timing and the second timing, respectively, and provide the first aberration compensation signal and the second aberration compensation signal to an image rendering circuit: the image rendering circuit, configured to generate the first display information and the second display information during the first timing and the second timing, respectively, and encode the first display information and the second display information and provide the first display information and the second display information to the display source; one or more reflectors, configured to reflect the first linearly polarized light and the second linearly polarized light from the polarizer to the optical path controller; and a collimator, located between the display source and the polarizer, and is configured to collimate the light from the display source and transmit the collimated light to the polarizer.

According to an aspect of the disclosure, a method for driving a display apparatus is provided, the method may include: during the first timing, outputting the light having the first display information by the display source, converting the light having the first display information into the first linearly polarized light by the polarizer, receiving the first linearly polarized light from the polarizer, and projecting the first linearly polarized light along a first transmission path by the optical path controller, and during the second timing, outputting the light having the second display information by the display source, converting the light having the second display information into the second linearly polarized light by the polarizer, receiving the second linearly polarized light from the polarizer, and projecting the second linearly polarized light along a second transmission path by the optical path controller. The first transmission path is spatially separate from the second transmission path.

In an embodiment, the method may include: generating, by an aberration compensation circuit, a first aberration compensation signal and a second aberration compensation signal for compensating for aberrations generated by the first linearly polarized light and the second linearly polarized light during a propagation process thereof, during the first timing and the second timing, respectively, and providing the first aberration compensation signal and the second aberration compensation signal to an image rendering circuit, and generating, by the image rendering circuit, the first display information and the second display information, during the first timing and the second timing, respectively, and encoding the first display information and the second display information and providing the first display information and the second display information to the display source.

In an embodiment, the step of projecting the first linearly polarized light and the second linearly polarized light includes: projecting, by the optical path controller, the first linearly polarized light and the second linearly polarized light spatially separate from one another in a horizontal direction.

In an embodiment, the step of projecting, by the optical path controller, the first linearly polarized light and the second linearly polarized light spatially separate from one another in a horizontal direction includes: projecting the first linearly polarized light and the second linearly polarized light to a left part and a right part of a transflective element, respectively, and reflecting, by the transflective element, the first linearly polarized light and the second linearly polarized light.

BRIEF DESCRIPTION OF THE DRAWINGS

Embodiments of the present disclosure will be further described, only by way of example, in detail below in conjunction with the accompanying drawings and specific embodiments. Like reference numerals refer to like elements throughout the drawings, wherein.

DETAILED DESCRIPTION

The head-up display apparatus and the driving method thereof provided by the embodiments of the present disclosure will be described in detail below with reference to the accompanying drawings.

Figure 1:
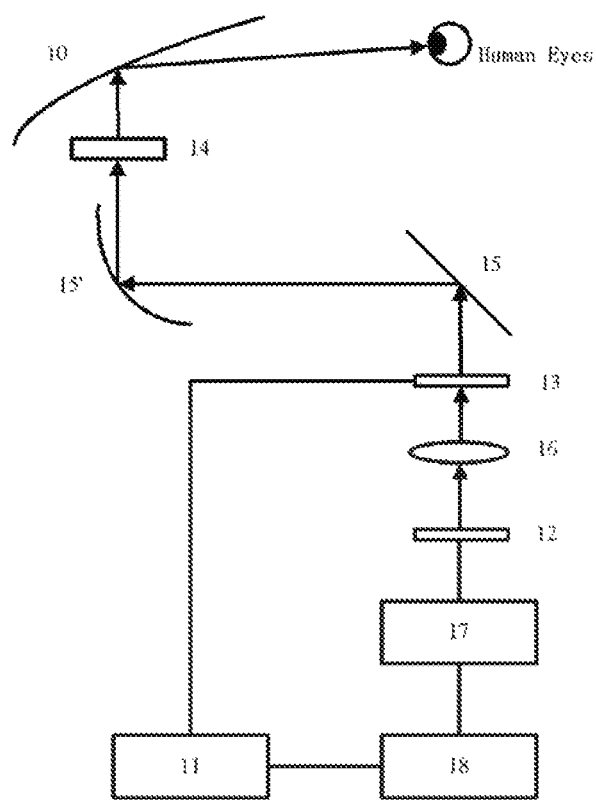
FIG. 1 shows a schematic diagram of a head-up display apparatus in accordance with an embodiment of the present disclosure.

FIG. 1 shows a schematic diagram of a head-up display apparatus in accordance with an embodiment of the present disclosure. Referring to FIG. 1, the head-up display apparatus may be used together with a transflective element, such as a windshield 10 of a vehicle. Specifically, the head-up display apparatus may include: a timing control circuit 11, a display source 12, a polarizer 13, an optical path controller 14, a first reflector 15, a second reflector 15', a collimator 16, an image rendering circuit 17 and an aberration compensation circuit 18. In addition, in FIG. 1, a position for a vehicle's driver to look at the windshield 10 is schematically illustrated by the human eye. Furthermore, it should be noted that in FIG. 1, the propagation path of light emitted from the display source 12 throughout the entire apparatus is shown by means of arrows. However, it should be understood that the locations of the components shown in FIG. 1 with respect to the propagation path of the light do not represent any limitation to the present disclosure, those skilled in the art may flexibly arrange these components as needed.

Referring to FIG. 1, the various components and the principles of operation thereof in the head-up display apparatus are now briefly described in accordance with an embodiment of the present disclosure.

In the head-up display apparatus, the display source 12, such as an LED panel or the like, may be configured to emit an encoded light. That is, the light emitted from the display source 12 may contain encoded display information. The encoded display information may be generated by the image rendering circuitry 17 and input into the display source 12. Furthermore, the image rendering circuit 17 may also receive an aberration compensation signal from optional aberration compensation circuit 18. The aberration compensation signal is configured to compensate for the aberration, such as aberration due to the optical path controller and the collimator, generated by the light emitted from the display source 12 and transmitted throughout the entire apparatus during a propagation process. A collimator 16 (e.g., a lens) may collimate the light from the display source and project the collimated light onto the polarizer 13.

Next, a time division multiplexing process which is implemented by means of the timing control circuit 11 in the head-up display apparatus will be described. Specifically, the timing control circuit 11 controls the entire head-up display apparatus during the first and second timings that alternate with each other. In particular, the timing control circuit 11 controls the polarizer 13, so that a user (for example, the vehicle's driver) may observe a linearly polarized light containing different display information during the second timing from a linearly polarized light containing display information during the first timing.

The timing control process will be described in detail below in conjunction with the timing control circuit 11, the polarizer 13, and the image rendering circuit 17. As an example, during the first timing, the timing control circuit 11 may control the polarizer 13 to receive the collimated light from the collimator 16 and convert it into a first linearly polarized light. In this case, in an embodiment, the timing control circuit 11 may also control the image rendering circuit 17 during the first timing, so that the image rendering circuit 17 generates first display information and provides it to the display source 12. As such, the display source 12 may generate a light containing the first display information during the first timing. At this time, in consideration of the control of the timing control circuit 11 on the polarizer 13 described above, the first linearly polarized light output from the polarizer 13 during the first timing may contain the first display information.

Similarly, during the second timing, the timing control circuit 11 may control the polarizer 13 to receive the collimated light from the collimator 16 and convert it into a second linearly polarized light having a polarization direction perpendicular to a polarization direction of the first linearly polarized light. In this case, in an embodiment, the timing control circuit 11 may also control the image rendering circuit 17 during the second timing, so that the image rendering circuit 17 generates second display information different from the first display information and provides it to the display source 12. As such, similarly to the process of the first timing, the display source 12 may generate a light containing the second display information during the second timing. Further, in consideration of the control of the timing control circuit 11 on the polarizer 13 described above, the second linearly polarized light output from the polarizer 13 during the second timing may contain the second display information.

In an embodiment, in the head-up display apparatus according to the embodiments of the present disclosure, the collimator 16 may also be configured to compensate for the aberration of the apparatus. For example, a diffractive optical element in the collimator 16 can be configured to compensate for the aberration, since the diffractive optical element has an aberration characteristic opposite to that of the refractive prism.

As an example, the first display information may include vehicle state information such as a vehicle speed, an oil temperature, a water temperature, etc., and the second display information may include augmented reality information such as indication information of an external object, navigation information, and the like.

By means of the control of the timing control circuit 11 on the polarizer 13 and the image rendering circuit 17, the function of time division multiplexing of the entire head-up display apparatus can be achieved. When the head-up display apparatus is in normal operation, the polarizer 13 provides two linearly polarized lights having polarization directions perpendicular to each other, such as a S-polarized light and a P-polarized light, during the first timing and the second timing, respectively, and the two linearly polarized lights include different display information, respectively. For example, the first linearly polarized light contains the first display information, and the second linearly polarized light contains the second display information. The S-polarized light refers to a polarized light having a polarization direction perpendicular to a propagation plane, and the P-polarized light refers to a polarized light having a polarization direction within the propagation plane.

It is to be noted that the polarization directions that are perpendicular to each other are provided as an example herein, and do not represent any limitation to the present disclosure. In fact, in the head-up display apparatus according to the present disclosure, two linearly polarized lights, i.e., the first linearly polarized light and the second linearly polarized light, may have any different polarization directions, for example, two polarization directions having an acute angle (non-ninety degrees) therebetween. Such different polarization directions can be obtained by means of a polarizer, which should be readily understood by those skilled in the art and will not be described in detail herein.

Along the propagation path of the light, after exiting from the polarizer 13, the first linearly polarized light or the second linearly polarized light reaches the optical path controller 14 after being reflected by a first reflector 15 and a second reflector 15' that are optional, respectively. Here, it should be noted that the two reflectors 15, 15' may also be omitted as needed, or the number of the reflectors may be more or less, such as one, three, and the like. In general, by introducing one or more reflectors 15, 15', it is advantageous to achieve flexibly folded optical path throughout the apparatus, thereby further reducing the space volume occupied by the apparatus.

Figure 2:
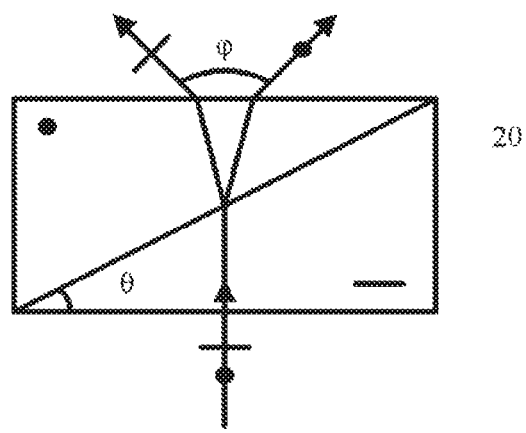
FIG. 2 shows a cross-sectional view of a single Wollaston prism as an optical path controller in a head-up display apparatus in accordance with an embodiment of the present disclosure.
Figure 3:
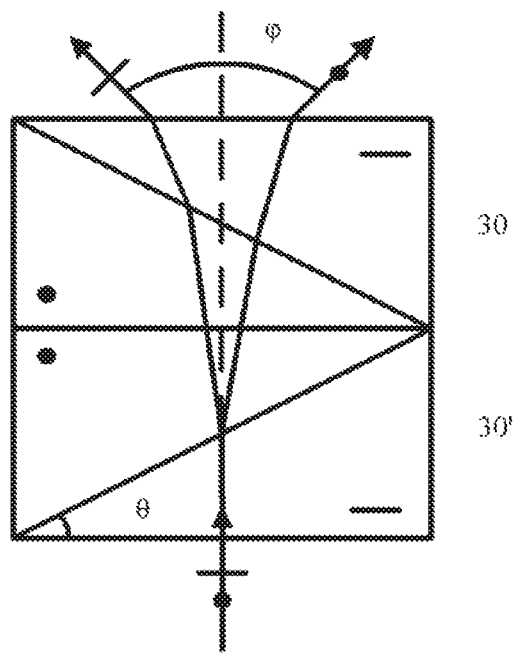
FIG. 3 shows a cross-sectional view of two Wollaston prisms stacked on each other as an optical path controller in a head-up display apparatus in accordance with an embodiment of the present disclosure.

As an example, a polarization beam splitter prism, such as a Wollaston prism can function as the optical path controller 14. Next, the operation of the optical path controller 14 in the head-up display apparatus according to an embodiment of the present disclosure will be described with reference to FIGS. 2 and 3. FIG. 2 shows a cross-sectional view of a single Wollaston prism as an optical path controller in a head-up display apparatus in accordance with an embodiment of the present disclosure, and FIG. 3 shows a cross-sectional view of two Wollaston prisms stacked on each other as an optical path controller in a head-up display apparatus in accordance with an embodiment of the present disclosure.

Typically, the Wollaston prism is made of a birefringent crystalline material such as calcite, however the material for forming the Wollaston prism is not limited thereto. The Wollaston prism is generally composed of two right-angle prisms in structure, and the optical axis directions of the two right-angle prisms are perpendicular to each other, as shown in FIGS. 2 and 3. When two linearly polarized lights (such as the S-polarized light and the P-polarized light) having polarization directions that are perpendicular to each other are transmitted through the Wollaston prism, the two linearly polarized lights spatially separate from each other. As shown in FIG. 2, when the apex angles of the two right-angle prisms are both θ, the S-polarized light and the P-polarized light (in FIGS. 2 and 3, the S-polarized light and the P-polarized light are shown by a short line and a dot, respectively) incident at a same angle spatially separate from each other by an angle φ, where θ and φ satisfy the following equation:

$$\varphi = 2\sin^{-1}[(n_o - n_e)\tan\theta]$$

wherein $n_o$ and $n_e$ are the ordinary-light refractive index and the extraordinary-light refractive index of the calcite, respectively, and $n_o > n_e$, since the calcite is a negative crystal material.

In an embodiment, several (e.g., two) Wollaston prisms may be stacked on each other to expand the spatial separation of the two linearly polarized lights (i.e., the S-polarized light and the P-polarized light). In an embodiment, two adjacent Wollaston prisms are arranged to be mirror-symmetrical with regard to an interface therebetween. As shown in FIG. 3, when the two Wollaston prisms 30, 30' are stacked on each other, the S-polarized light and the P-polarized light incident at the same angle may exit with a larger angle φ therebetween. As such, those skilled in the art can select any suitable number of Wollaston prisms and stack them on each other, so as to obtain the optical path controller as needed, thereby realizing the space separation of the output directions of different linearly polarized lights. Since the Wollaston prism 20, 30, or 30' changes the propagation paths of different linearly polarized lights, for example, as shown in FIGS. 2 and 3, the S-polarized light propagates towards the left, and the P-polarized light propagates towards the right. Therefore, during the first and second timings, the S-polarized light and the P-polarized light output from the Wollaston prism may propagate toward the windshield along two different optical paths, respectively.

Figure 4:
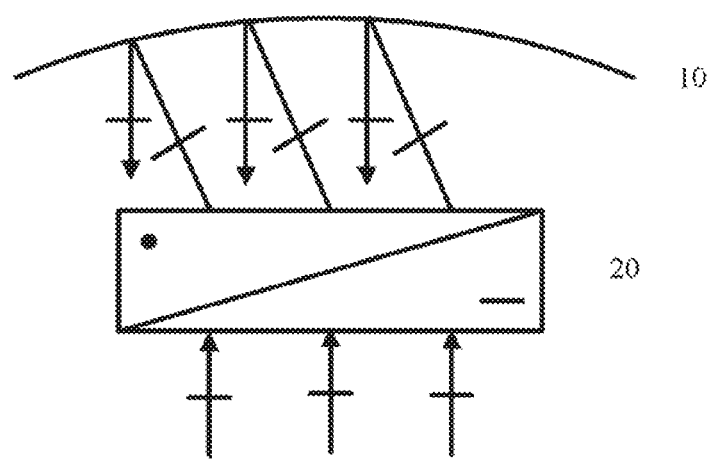
FIG. 4 shows a cross-sectional view showing a change in a propagation path of a first linearly polarized light by an optical path controller during a first timing in a head-up display apparatus in accordance with an embodiment of the present disclosure.
Figure 5:
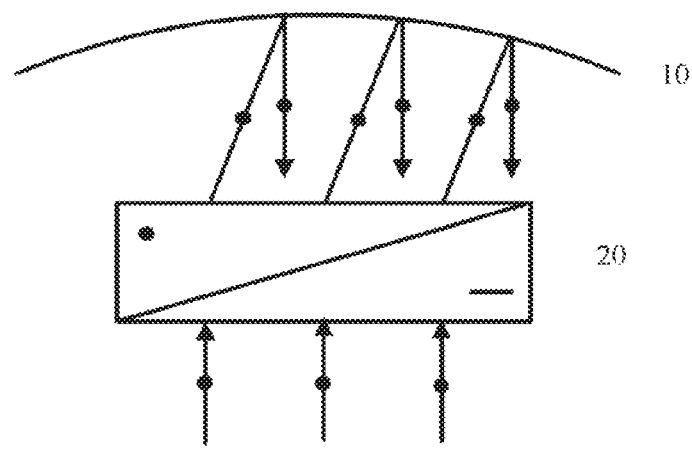
FIG. 5 shows a cross-sectional view showing a change in a propagation path of a second linearly polarized light by an optical path controller during a second timing in a head-up display apparatus in accordance with an embodiment of the present disclosure.
Figure 6:
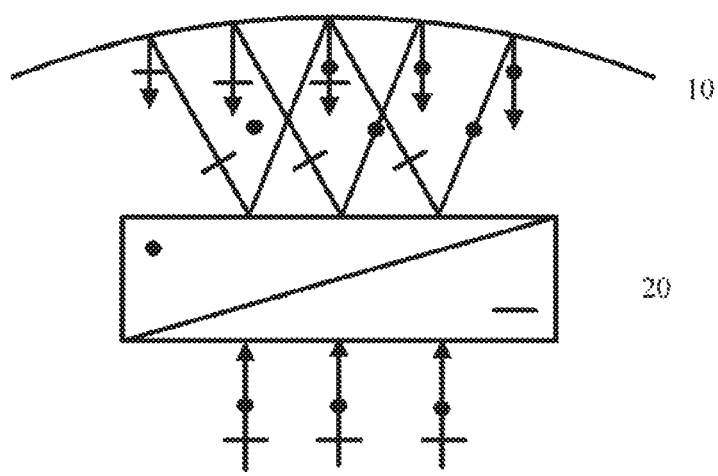
FIG. 6 shows a cross-sectional view showing a change in propagation paths of a first linearly polarized light and a second linearly polarized light by an optical path controller during a first timing and a second timing in a head-up display apparatus in accordance with an embodiment of the present disclosure.

Next, a reflection process, on the windshield, of two different linearly polarized lights from the Wollaston prism will be described with reference to FIGS. 4, 5, and 6. FIG. 4 shows the reflection of the S-polarized light during the first timing; FIG. 5 shows the reflection of the P-polarized light during the second timing; and FIG. 6 shows the reflection, on the windshield, of both S-polarized and P-polarized light during the first timing and the second timing. As seen from FIGS. 4-6, when the Wollaston prism 20, or 30 and 30' is/are fixed with regard to the windshield 10, the S-polarized light and the P-polarized light output from the Wollaston prism 20, or 30 and 30' is/are incident on the windshield 10 at different angles, for example, the S-polarized light and the P-polarized light are incident on the windshield 10 at the same angle in the opposite directions. For example, the S-polarized light is incident on the left of the windshield 10 at a specific angle, and the P-polarized light is incident on the right of the windshield 10 at the specific angle. Further, as show in FIGS. 4 and 5, it can be seen that the S-polarized light and the P-polarized light are incident on the left and right parts of the windshield 10, respectively. Thus, after reflected by the windshield 10, the two linearly polarized lights, i.e., the S-polarized light and the P-polarized light, may propagate toward the driver from the left and right sides, respectively. That is, the two linearly polarized lights output during the first timing and the second timing may enter into the eyes of the driver spatially separated from each other along the horizontal direction.

It should be noted that, herein, the spatial separation of the first linearly polarized light and the second linearly polarized light refers to that the first linearly polarized light received during the first timing and the second linearly polarized light received during the second timing occupy different spatial positions that are separated from each other. Further, it should also be noted that the term "spatial separation" herein may include "completely spatial separation" as well as "partially spatial separation", and the present disclosure is not limited thereto.

It should be noted that the term "spatial separation in the horizontal direction" herein refers to the spatial separation of the two polarized lights in a horizontal plane when the user looks at the head-up display apparatus at an eye level.

Figure 7:
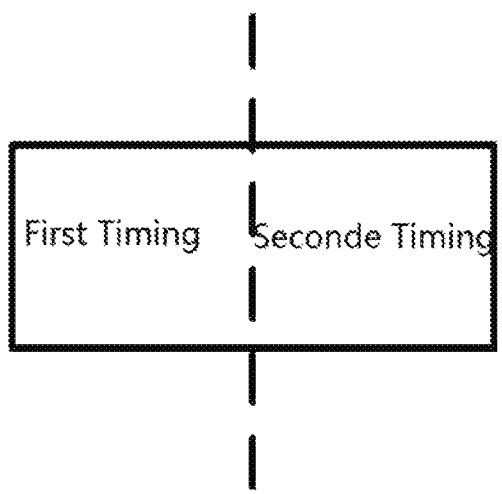
FIG. 7 is a schematic diagram showing a reflection region of a first linearly polarized light during a first timing and a reflection region of a second linearly polarized light during a second timing on a windshield.

FIG. 7 shows a schematic diagram of a reflective region, on the windshield, of the first linearly polarized light during the first timing and the second linearly polarized light during the second timing. Referring to FIG. 7, the first linearly polarized light during the first timing and the second linearly polarized light during the second timing are respectively incident on the left and right parts of the windshield, and reflected to the driver' eyes. Specifically, the head-up display apparatus and its various components may be appropriately arranged relative to the windshield to horizontally separate the two linearly polarized lights, before the lights reach the driver's eyes.

Figure 8:
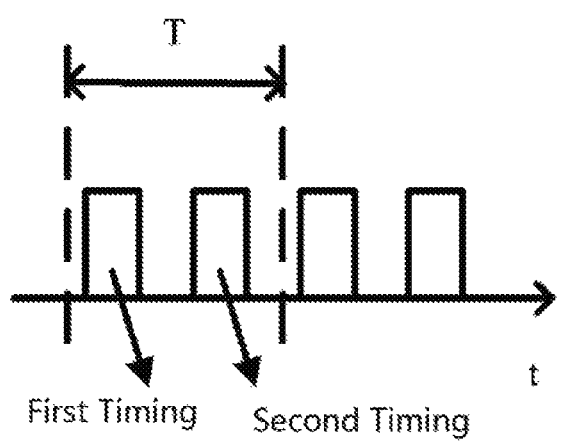
FIG. 8 shows a timing diagram of a first timing and a second timing according to an embodiment of the present disclosure.

In an embodiment, the first timing and the second timing alternate in a display period that is less than a refresh period (typically about 1/30 s) of human eyes. FIG. 8 shows a timing diagram of a first timing and a second timing in accordance with an embodiment of the present disclosure. As can be seen from FIG. 8, the first timing and the second timing alternate (i.e., alternately occur) with each other. The immediately adjacent first timing and second timing constitute a display period T, and the display period T is smaller than the refresh period of the human eyes. Typically, the refresh frequency of the human eyes is about 30 Hz, that is, the refresh period of the human eyes is about (1/30) s. In this case, the human eyes cannot separately distinguish the outgoing lights during the first timing and the second timing due to the visual persistence. This means that the human eye may see a superposition of the first linearly polarized light (such as the S-polarized light) during the first timing and the second linearly polarized light (such as the P-polarized light) during the second timing. Therefore, in the head-up display apparatus according to the embodiment of the present disclosure, two different linearly polarized lights are output during different timings, so that the viewing angle of the driver is increased, specifically, as shown in FIG. 6, the viewing angle of the driver is twice as large as that in the case of only one linearly polarized light.

Figure 9:
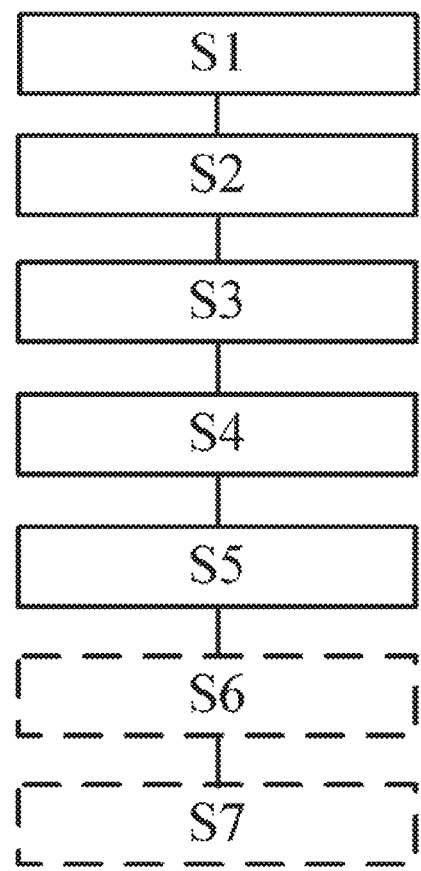
FIG. 9 shows a flow chart of a driving method for a head-up display apparatus in accordance with an embodiment of the present disclosure.

FIG. 9 shows a flow chart of a driving method for a head-up display apparatus in accordance with an embodiment of the present disclosure. Referring to FIG. 9, the driving method may include the following steps S1, S2, S3, S4 and S5.

Step S1, a display source 12 outputs a light containing display information.

Step S2, during the first timing, a polarizer 13 receives the light from the display source 12 and generates a first linearly polarized light (such as an S-polarized light).

Step S3, during the first timing, an optical path controller 14 receives the first linearly polarized light from the polarizer 13 and projects the first linearly polarized light onto a windshield 10 along a first propagation path.

Step S4, during the second timing, the polarizer 13 receives the light from the display source 12 and generates a second linearly polarized light (such as a P-polarized light).

Step S5, during the second timing, the optical path controller 14 receives the second linearly polarized light from the polarizer 13 and projects the second linearly polarized light onto the windshield 10 along a second propagation path, wherein the first propagation path is different from the second propagation path.

It should be noted that the order of the steps described above is merely an example, and it does not mean that the steps must be actually performed in such an order. Those skilled in the art may perform the steps described above of the driving method in any suitable order as needed.

In an embodiment, the above driving method for the head-up display apparatus may further include the following steps S6 and S7.

Step S6, an image rendering circuit 17 generates different display information, for example, first display information and second display information, respectively during the first timing and the second timing, encodes the first display information and the second display information, and provides the encoded first display information and the encoded second display information to the display source 12.

Step S7, an aberration compensation circuit 18 generates a first aberration compensation signal and a second aberration compensation signal, respectively, during the first timing and the second timing, and provides the first aberration compensation signal and the second aberration compensation signal to the image rendering circuit 17, wherein the first aberration compensation signal and the second aberration compensation signal are configured to compensate for aberrations generated by the first linearly polarized light and the second linearly polarized light during propagation process, respectively.

The present disclosure provides a head-up display apparatus and a method for driving the same. The head-up display apparatus has a viewing angle larger than that of a conventional head-up display apparatus (e.g., twice or double as large as that of the conventional viewing angle). Specifically, according to an embodiment of the present disclosure, an optical path controller is introduced into the head-up display apparatus, such that the lights having different polarization directions are incident on different parts of the windshield at different angles, thereby achieving spatial separation of output directions of different linearly polarized lights. Further, in the embodiment of the present disclosure, time division multiplexing of the head-up display apparatus is also realized by using the timing control circuit. Specifically, during the first timing, the polarizer outputs the first linearly polarized light; and during the second timing, the polarizer outputs a second linearly polarized light that is different from the first linearly polarized light. In this manner, the optical path controller such as a Wollaston prism is further included to deflect the polarized lights in varying degrees, so that the spatial separation of the first linearly polarized light and the second linearly polarized light can be achieved.

Thus, when the first timing and the second timing are set to alternately appear within a display period less than the refresh period of human eyes, the human eyes can simultaneously see the spatially separated lights, i.e., the first linearly polarized light and the second linearly polarized light reflected from the windshield, thereby increasing the viewing angle of the entire head-up display apparatus. Furthermore, an image rendering circuit may be included to encode the first linearly polarized light and the second linearly polarized light with different display information such as navigation information, vehicle state information, or a driving environment image during the first timing and the second timing, so that the driver of the vehicle may see these information without looking down at the instrument panel, thereby avoiding the potential risk of traffic accidents. In addition, the increased viewing angle helps the driver to display more information, which facilitates avoiding violation of traffic rules and facilitates reduction of the accident rate.

Further, according to an embodiment of the present disclosure, the head-up display apparatus may include conventional optical elements such as a reflector, a Wollaston prism, a collimator, and the like, so as to avoid problems such as excessive apparatus size, larger apparatus space, and difficulty in fabrication and processing due to the use of complex optical elements such as a reflector having a free-form surface. That is to say, compared with a conventional optical apparatus, the head-up display apparatus according to embodiments of the present disclosure has a much smaller size, a significantly reduced volume, a significantly reduced difficulty in manufacturing, and much lower cost, so that the head-up display apparatus may be placed within a mini-sized vehicle.

It should be understood that the above implementations are merely exemplary embodiments for the purpose of illustrating the principles of the present disclosure, however, the present disclosure is not limited thereto. It will be apparent to those skilled in the art that various changes and modifications can be made without departing from the spirit and spirit of the present disclosure, which are also to be regarded as the scope of the present disclosure.

What is claimed is:

1. A display apparatus, comprising: a timing control circuit, a display source, a polarizer, an optical path controller, an aberration compensation circuit, and an image rendering circuit, wherein
    the display source is configured to generate a light having first display information and a light having second display information, under control of the timing control circuit, during mutually alternate first and second timings, respectively, the first display information being different from the second display information;
    the polarizer is configured to, under control of the timing control circuit, convert the light having the first display information into a first linearly polarized light during the first timing, and convert the light having the second display information into a second linearly polarized light during the second timing, the first linearly polarized light and the second linearly polarized light having different polarization directions;
    the optical path controller is configured to receive the first linearly polarized light and the second linearly polarized light from the polarizer, and project the first linearly polarized light and the second linearly polarized light spatially separate from one another;
    the aberration compensation circuit is configured to generate a first aberration compensation signal and a second aberration compensation signal for compensating for aberrations generated by the first linearly polarized light and the second linearly polarized light during a propagation process thereof, during the first timing and the second timing, respectively, and provide the first aberration compensation signal and the second aberration compensation signal to an image rendering circuit; and
    the image rendering circuit is configured to generate the first display information and the second display information during the first timing and the second timing, respectively, and encode the first display information and the second display information, and provide the first display information and the second display information to the display source.

2. The display apparatus according to claim 1, wherein the first linearly polarized light has a polarization direction that is perpendicular to a polarization direction of the second linearly polarized light.

3. The display apparatus according to claim 1, wherein the first linearly polarized light and the second linearly polarized light are projected spatially separate from one another in a horizontal direction.

4. The display apparatus according to claim 1, further comprising a transflective element, wherein
the first linearly polarized light and the second linearly polarized light are projected on a left part and a right part of the transflective element, respectively, and
the transflective element is configured to reflect the first linearly polarized light and the second linearly polarized light.

5. The display apparatus according to claim 1, wherein the optical path controller comprises a polarization beam splitter prism.

6. The display apparatus according to claim 5, wherein the polarization beam splitter prism comprises a single Wollaston prism.

7. The display apparatus according to claim 5, wherein
the polarization beam splitter prism comprises a plurality of Wollaston prisms stacked on each other, and
two adjacent Wollaston prisms are arranged to be mirror-symmetrical with regard to an interface therebetween.

8. The display apparatus according to claim 2, wherein
the first linearly polarized light comprises one of an S-polarized light and a P-polarized light; and
the second linearly polarized light comprises the other one of the S-polarized light and the P-polarized light.

9. The display apparatus according to claim 1, further comprising: one or more reflectors configured to reflect the first linearly polarized light and the second linearly polarized light from the polarizer to the optical path controller.

10. The display apparatus according to claim 1, wherein
immediately adjacent one first timing and one second timing constitute a display period, and
the display period is smaller than a refresh period of human eyes.

11. The display apparatus according to claim 1, wherein
the first display information comprises one or more of a vehicle speed, an oil temperature, and a water temperature, and
the second display information comprises one or more of indication information of an external object and navigation information.

12. The display apparatus according to claim 1, further comprising a collimator located between the display source and the polarizer, wherein
the collimator is configured to collimate the light from the display source and transmit the collimated light to the polarizer.

13. The display apparatus according to claim 1, further comprising:
one or more reflectors, configured to reflect the first linearly polarized light and the second linearly polarized light from the polarizer to the optical path controller; and
a collimator, located between the display source and the polarizer, and is configured to collimate the light from the display source and transmit the collimated light to the polarizer.

14. A method for driving a display apparatus, the display apparatus being the display apparatus according to claim 1, the method comprising:
during the first timing, outputting the light having the first display information by the display source, converting the light having the first display information into the first linearly polarized light by the polarizer, receiving the first linearly polarized light from the polarizer, and projecting the first linearly polarized light along a first transmission path by the optical path controller, and
during the second timing, outputting the light having the second display information by the display source, converting the light having the second display information into the second linearly polarized light by the polarizer, receiving the second linearly polarized light from the polarizer, and projecting the second linearly polarized light along a second transmission path by the optical path controller,
wherein the first transmission path is spatially separate from the second transmission path,
and wherein the method further comprises:
generating, by the aberration compensation circuit, the first aberration compensation signal and the second aberration compensation signal for compensating for the aberrations generated by the first linearly polarized light and the second linearly polarized light during a propagation process thereof, during the first timing and the second timing, respectively, and providing the first aberration compensation signal and the second aberration compensation signal to the image rendering circuit, and
generating, by the image rendering circuit, the first display information and the second display information, during the first timing and the second timing, respectively, encoding the first display information and the second display information, and providing the first display information and the second display information to the display source.

15. The method according to claim 14, wherein
the step of projecting the first linearly polarized light and the second linearly polarized light comprises:
projecting, by the optical path controller, the first linearly polarized light and the second linearly polarized light spatially separate from one another in a horizontal direction.

16. The method according to claim 15, wherein
the step of projecting, by the optical path controller, the first linearly polarized light and the second linearly polarized light spatially separate from one another in a horizontal direction comprises:
projecting the first linearly polarized light and the second linearly polarized light to a left part and a right part of a transflective element, respectively, and
reflecting, by the transflective element, the first linearly polarized light and the second linearly polarized light.

* * * * *